United States Patent [19]

Wright et al.

[11] Patent Number: 5,356,597

[45] Date of Patent: * Oct. 18, 1994

[54] IN-DUCT FLUE GAS CONDITIONING SYSTEM

[75] Inventors: Robert A. Wright, Behner Crossing; George R. Dennis, Indianapolis, both of Ind.

[73] Assignee: Wilhelm Environmental Technologies, Inc., Indianapolis, Ind.

[*] Notice: The portion of the term of this patent subsequent to Aug. 31, 2010 has been disclaimed.

[21] Appl. No.: 922,576

[22] Filed: Jul. 30, 1992

Related U.S. Application Data

[63] Continuation-in-part of Ser. No. 864,847, Apr. 17, 1992, Pat. No. 5,288,303, and a continuation-in-part of Ser. No. 882,835, May 14, 1992, Pat. No. 5,288,309, and a continuation-in-part of Ser. No. 907,159, Jul. 1, 1992, Pat. No. 5,240,470.

[51] Int. Cl.$^5$ .................. B01D 50/00; B01D 53/36
[52] U.S. Cl. .................. 422/169; 55/422; 95/6; 95/7; 96/18; 96/22; 96/74; 422/177; 422/178
[58] Field of Search .......... 422/171, 177, 211, 169, 422/178, 180, 160; 502/242; 423/244.09, 244.1, 522, 533; 96/18, 74, 22–24; 55/422; 95/6, 7

[56] References Cited

U.S. PATENT DOCUMENTS

| | | |
|---|---|---|
| 1,441,713 | 1/1923 | Prosser . |
| 1,909,825 | 5/1933 | Hahn et al. . |
| 2,602,734 | 7/1952 | Hedberg et al. ............... 75/1 |
| 2,864,456 | 12/1958 | Hall et al. ................. 183/7 |
| 3,284,990 | 11/1966 | Orne ......................... 55/5 |
| 3,363,398 | 1/1968 | Wheatcroft et al. ........... 55/5 |
| 3,424,560 | 1/1969 | Carmassi et al. ............ 23/278 |
| 3,523,407 | 8/1970 | Humbert .................. 55/106 |
| 3,568,403 | 3/1971 | Richardson ................. 55/5 |
| 3,581,463 | 6/1971 | Roberts ..................... 55/4 |
| 3,607,034 | 9/1971 | Henry et al. .............. 23/168 |
| 3,665,676 | 5/1972 | McKewen .................... 55/4 |
| 3,686,825 | 8/1972 | Busby ....................... 55/5 |
| 3,689,213 | 9/1972 | Guerrieri ................... 55/5 |
| 3,704,569 | 12/1972 | Hardison et al. ............. 55/4 |
| 3,719,471 | 3/1973 | Jones ...................... 75/65 |
| 3,722,178 | 3/1973 | Aaland et al. ............... 55/4 |
| 3,818,682 | 6/1974 | Farrow et al. ............. 55/106 |
| 3,893,828 | 7/1975 | Archer .................... 55/104 |
| 3,966,436 | 6/1976 | Archer .................... 55/147 |
| 3,993,429 | 11/1976 | Archer ..................... 431/5 |

(List continued on next page.)

FOREIGN PATENT DOCUMENTS

| | | |
|---|---|---|
| 639992 | 5/1964 | Belgium . |
| 888086 | 12/1971 | Canada . |
| 1178025 | 11/1984 | Canada . |
| 2809199 | 9/1979 | Fed. Rep. of Germany . |
| 3108709 | 9/1982 | Fed. Rep. of Germany . |
| 3109847 | 9/1982 | Fed. Rep. of Germany . |
| 45-13927 | 5/1970 | Japan . |
| 1093617 | 12/1967 | United Kingdom ......... B03C 49/00 |
| 1406109 | 9/1975 | United Kingdom . |

Primary Examiner—Amalia L. Santiago
Attorney, Agent, or Firm—Willian Brinks Hofer Gilson & Lione

[57] ABSTRACT

The present invention provides a flue gas conditioning system and method for generating conditioning agent used in the removal of entrained particles in a flue gas flow with an electrostatic precipitator. The invention involves the use of a catalytic converter movable between an operative position where the flue gas flows through the catalyst and converts $SO_2$ contained in the flue gas to $SO_3$ when conditioning agent is needed and an inoperative position where the flue gas does not flow through the catalyst when conditioning agent is no longer needed. The movable catalytic converter and related assembly may take variable configurations to accommodate various flue gas ductworks and space limitations and may carry one or more $SO_2/SO_3$ converters providing a plurality of open and generally parallel flow paths of the flue gas that are formed by a catalyst effective over a wide range of temperatures for the controlled conversion of preferably a low percentage of $SO_2$ in the flue gas to $SO_3$.

25 Claims, 9 Drawing Sheets

U.S. PATENT DOCUMENTS

| | | | |
|---|---|---|---|
| 4,035,165 | 7/1977 | Archer | 55/13 |
| 4,042,348 | 8/1977 | Bennett et al. | 55/5 |
| 4,058,372 | 11/1977 | DeLaMater | 55/5 |
| 4,205,630 | 6/1980 | Regan | 122/1 R |
| 4,208,192 | 6/1980 | Quigley et al. | 55/5 |
| 4,223,640 | 9/1980 | Rochford et al. | 122/1 R |
| 4,284,417 | 8/1981 | Reese et al. | 55/2 |
| 4,284,530 | 8/1981 | Sherif | 252/455 R |
| 4,305,909 | 12/1981 | Willett et al. | 422/169 |
| 4,333,746 | 6/1982 | Southam | 55/106 |
| 4,390,831 | 6/1983 | Byrd et al. | 323/240 |
| 4,466,815 | 8/1984 | Southam | 55/122 |
| 4,533,364 | 8/1985 | Altman et al. | 55/5 |
| 4,548,789 | 10/1985 | Ballestra | 422/160 |
| 4,624,685 | 11/1986 | Lueckenotte et al. | 55/13 |
| 4,770,674 | 9/1988 | Tellini et al. | 55/5 |
| 4,779,207 | 10/1988 | Woracek et al. | 364/500 |
| 4,844,723 | 7/1989 | Tellini et al. | 55/106 |
| 4,931,265 | 6/1990 | Leussler | 423/244 |
| 4,952,374 | 8/1990 | Baillie | 422/211 X |
| 4,966,610 | 10/1990 | Krigmont et al. | 55/5 |
| 4,987,839 | 1/1991 | Krigmont et al. | 110/216 |
| 5,008,628 | 4/1991 | Krigmont et al. | 324/693 |
| 5,011,516 | 4/1991 | Altman et al. | 55/5 |
| 5,024,171 | 6/1991 | Krigmont et al. | 110/345 |
| 5,029,535 | 7/1991 | Krigmont et al. | 110/345 |
| 5,032,154 | 7/1991 | Wright | 55/106 |
| 5,175,136 | 12/1992 | Felthouse | 502/242 |
| 5,240,470 | 8/1993 | Wright | 422/171 X |

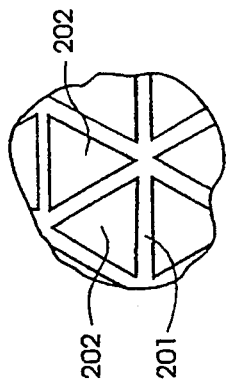
Fig. 11C
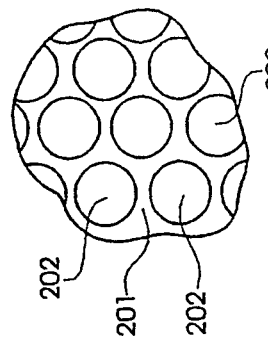
Fig. 11D
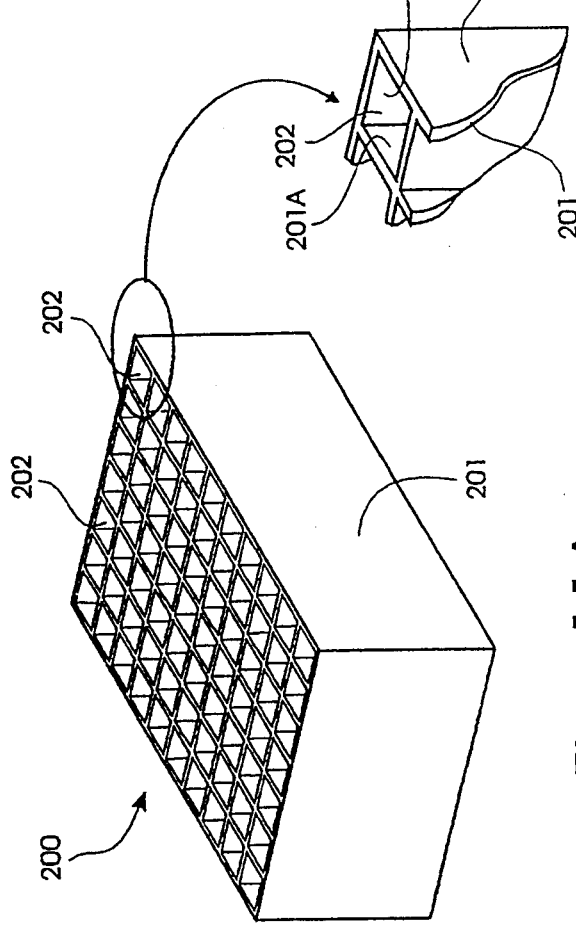
Fig. 11B
Fig. 11A

IN-DUCT FLUE GAS CONDITIONING SYSTEM

This is a continuation in part of U.S. patent application Ser. Nos. 07/864,847 filed Apr. 17, 1992 now U.S. Pat. No. 5,288,303, 07/882,835 filed May 14, 1992 now U.S. Pat. No. 5,288,309, and 07/907,159 filed Jul. 1, 1992 (now U.S. Pat. No. 5,240,470, issued Aug. 31, 1993).

FIELD OF THE INVENTION

This invention relates to a system for treating boiler flue gas to improve the removal of particulate matter contained therein by electrostatic means and, more particularly, relates to a flue gas conditioning system for converting sulfur dioxide in the flue gas into sulfur trioxide to provide conditioning agent to the flue gas particulate matter prior to its passage through an electrostatic precipitator.

BACKGROUND OF THE INVENTION

The increasing demand for electrical power has forced electrical utilities to burn increasing quantities of fossil fuels such as coal; however, electric utilities also face increasing environmental standards imposed upon their operation. In order to reduce air pollutants, electrical utilities have turned to burning low-sulfur coals to fire their boiler furnaces to generate the steam needed for generating electrical power. In addition, electrical utilities generally use a flue gas treatment system to remove the majority of the particulate matter in the gas effluent. A flue gas treatment system generally comprises an electrostatic means, such as an electrostatic precipitator, and a conditioning agent source for introducing a conditioning agent into the flue gas stream to enhance the efficiency of the precipitator in removing particulate matter.

The efficiency of an electrostatic precipitator in removing particulate matter from the boiler flue gas is partially dependent upon the electrical resistivity of the entrained particulate matter in the boiler flue gas. The entrained particulate matter expelled from a boiler fired with low-sulfur coal, i.e., coal having less than 1 percent sulfur, has been found to have a resistivity of approximately $10^{13}$ ohms/cm. It has been determined that the most efficient removal of particulate matter by electrostatic precipitation occurs when the particulate matter resistivity is approximately $10^8$ ohms/cm. Therefore, to obtain more effective use of an electrostatic precipitator, the resistivity of the entrained particulate matter from low-sulfur content coals must be reduced. Electrical utilities have long used conditioning agents introduced into the flue gas flow upstream of the electrostatic precipitator to reduce the resistivity of the entrained particles. Various chemicals, such as water and anhydrous ammonia, sulfuric acid, sulfur trioxide and phosphoric acid and various ammonia-bearing solutions have been used as conditioning agents.

Flue gas treatment systems which have been considered for use in the generation of sulfur trioxide conditioning agents include those frequently referred to as "slipstream" systems. In theory, some of the flue gas can be removed from the boiler ductwork, passed across a converter where $SO_2$ contained in the flue gas is converted to $SO_3$ and piped back into the ductwork, where the $SO_3$ in the flue gas will reduce the fly ash resistivity and increase precipitator efficiency as described above. An advantage of this method is that the $SO_2$ and the heat required for the $SO_2/SO_3$ conversion are already present in the flue gas at no additional cost.

Systems embodying this theory are known. Most, if not all, suggest removing a small proportion of the flue gas, referred to as a "slipstream" from the duct at a temperature to suit conversion, which is typically approximately 800° F. Because the flue gas contained fly ash, which could inhibit the effectiveness of conventional catalyst material, the slipstream was cleaned by a precipitator because conventional baghouse filters do not normally operate at these temperatures. Precipitators operating at these high temperatures (commonly called "hotside units") were expensive, when fabricated to withstand high temperatures. Following cleaning, the slipstream was then passed across a catalytic converter and the slipstream with an increased $SO_3$ content was piped back into the ductwork ahead of, or behind, the airheater.

In such prior systems, a high efficiency catalyst system was used. Such high efficiency catalyst systems comprised a vanadum pentoxide catalyst bonded to the surface of ceramic pellets or rings, such as right circular cylinder pellets about ½ inch (1.27 cm) in diameter by about ¾ inch (1.90 cm) in length and rings having an outer diameter of about ¾ inch (1.90 cm), an inner diameter of ⅛ inch (0.32 cm) and a length of about ¾ inch (1.90 cm), and the catalyst coated ceramic pellets were packed in a bed that imposed on the flue gas stream a multiplicity of tortuous paths through the interstices of the catalyst bed that forced the flue gas to impinge upon and flow immediately adjacent the catalyst surfaces to achieve highly efficient conversion of the $SO_2$ to $SO_3$, for example, conversion efficiencies of 80% and greater.

U.S. Pat. No. 3,581,463 discloses such a slipstream method of removing suspended particulate matter from boiler flue gas wherein a portion of the flue gas is withdrawn, electrostatically cleaned to remove particulates, then passed through a catalyst chamber to convert sulfur dioxide contained in the flue gas to sulfur trioxide. The sulfur trioxide is then returned to the main flue gas stream which then passes through an electrostatic precipitator.

The slipstream was usually suggested to be about five percent of the total flue gas for a catalyst efficiency of approximately 80 percent. The slipstream normally contained 400 ppm $SO_2$ from the combustion of low sulfur coal, and after conversion of the $SO_2$, it contained about 320 ppm $SO_3$. When combined with the flue gas, the $SO_3$ content of such a slipstream could result in about 16 ppm of $SO_3$ in the flue gas, which could improve the operation of the precipitator.

Such proposed systems frequently included a blower or fan to draw the slipstream through the hotside precipitator and catalytic converter, and insulated probes if the converted slipstream was put back into the ductwork downstream of the airheater. The catalytic converter of such systems was relatively large in order to handle the slipstream at gas velocities suitable for conversion efficiencies of 80 percent or more, and was located close to the economizer outlet ductwork to operate at the correct temperatures.

More recently, Electric Power Research Institute ("EPRI"), Palo Alto, Calif., has proposed a system in which flue gas is withdrawn from the duct as before, but is passed through a catalytic converter without cleaning. The development of a catalyst which is effective in the presence of fly ash has eliminated the need for cleaning the flue gas. The catalytic converter and associated ductwork of EPRI's system are installed adjacent to the flue gas ductwork. The slipstream is ducted into the catalytic converter near the economizer where gas temperatures are about 800° F. The volume of the slipstream is controlled by an automatic valve. After conversion, the slipstream gas is re-introduced into the flue gas downstream of the airheater via low pressure insulated probes. This EPRI system operates at only a few inches of water gauge pressure, which is the reason for installing the probes downstream of the airheater, and consequently does not require a blower.

A small pilot system installed by EPRI with a capacity of 1000 acfm at 800° F. has operated without severe problems since November 1990. The converter efficiency of EPRI's system is believed to be approximately 60-80 percent. The catalytic converter is fitted with soot blowers, but catalytic converter pressure drop is so low that they have not been required.

For full scale operation, however, the EPRI slipstream system has some distinct disadvantages. First, the EPRI system requires the development of probes which will work at a low pressure drop to obtain the good $SO_3$ distribution necessary for effective operation. Unlike conventional probes which normally operate at 3-4 psig, the low pressure probes that are required must work at a gauge pressure of 5 or 6 inches of water column and operate with dust-laden gas. Second, control of the process depends upon the operation of the inlet high-temperature valve and the amount of $SO_3$ generated is dependent upon the slipstream entry location selected. Third, the $SO_3$ slipstream must re-enter the ductwork downstream of the airheater. Some plants have short ductwork runs between the airheater and the precipitator, and there is insufficient room for re-entry ductwork. Fourth, the slipstream ductwork must be carefully designed for low pressure drop and be very well insulated, and the slipstream ductwork route may be long and somewhat expensive for some boiler furnace arrangements.

All the proposed slipstream systems known to applicant, including the EPRI pilot plant, propose to use a relatively small slipstream, 2 to 5 percent, and attempt to achieve high-efficiency catalytic conversion before re-introduction into the main flow of flue gas. All of the proposed systems take the slipstream outside of the ductwork for passage through the catalytic converter, and then return the $SO_3$-laden gas to the ductwork either upstream or downstream of the airheater. The serious problem attendant with such proposed slipstream systems include not only those set forth above, but also prohibitively high costs and lack of satisfactory process control.

Controlling the flow of a flue gas conditioning agent has been approached in a variety of ways. The quantity of conditioning agent produced has been commonly determined by the quantity of coal being burned, precipitator power and/or the opacity of the flue gas generated by the coal combustion. For example, U.S. Pat. No. 2,864,456 discloses an automatic control for electrostatic precipitators which varies both the electrostatic precipitator voltage and the supply of a conditioning agent, such as water, for conditioning particles to be removed by the electrostatic precipitator and to maintain an optimum sparking rate for maximum efficiency in the removal of the particles.

U.S. Pat. No. 3,523,407 discloses a method of improving the electrostatic precipitation of particles from a flue gas by adding pre-selected amounts of ammonia and water to the flue gas stream upstream of the precipitator.

U.S. Pat. No. 3,665,676 discloses a system to condition the particles of boiler flue gas which includes a metering means for controlling the amount of conditioner injected into the flue gas. The conditioning agent, preferably a salt solution such as ammonium sulfate or ammonium bisulfate, is injected into the flue gas prior to entering the electrostatic precipitator. U.S. Pat. No. 3,665,676 discloses that, if desired, conventional automatic controls can be provided to open the metering means when the flue gas reaches a desired operating temperature or to close it should the temperature fall below the desired operating temperature. In addition, automatic controls can also be made to open the metering means to provide an amount of conditioner needed in proportion to the volume of flue gas to be conditioned.

U.S. Pat. No. 3,689,213 discloses a process for treating flue gas in which gaseous sulfur trioxide is generated in the immediate vicinity of the point of use as required by the quantity of fossil fuel being burned per unit time and is then introduced into the flue gas at a predetermined rate to facilitate the removal of fly ash by an electrostatic precipitator.

U.S. Pat. No. 3,772,178 discloses a system for the production of sulfur trioxide for flue gas conditioning including means to deliver a source of sulfur, such as sulfuric acid, to a vaporizer in proportion to the amount of flue gas generated by the boiler, measured in terms of the electrical output generated at a particular time. As the production of flue gas changes in the boiler system, the proper ratio of sulfuric acid to flue gas is automatically maintained by control means responsive to a signal coming from a boiler capacity index gauge to control the volume of sulfur trioxide being produced by the system.

U.S. Pat. No. 3,993,429 discloses that $SO_3$ flue gas conditioning systems can operate by sensing the rate of coal combustion and varying the rate of flow of sulfur into the sulfur burner in response to the rate of coal combustion.

U.S. Pat. No. 4,770,674 discloses a system for conditioning flue gas for an electrostatic precipitator, including equipment for converting sulfur into sulfur trioxide. The disclosed systems of U.S. Pat. No. 4,770,674 include a sulfur burner to produce oxidized sulfur, a catalytic converter to convert the oxidized sulfur to sulfur trioxide, and means to control sulfur and air inputs to the sulfur burner. Various inputs to the control means are disclosed, including the outlet temperature of the catalytic converter, and such operating parameters of the exhaust stage of the system as the output temperature of the exhaust gas from the precipitator, the flow rate of the exhaust gas, the power delivered to or the speed of, an induced draft fan, if any, the opacity of the exhaust gas within the stack, and the power dissipated by the precipitator.

U.S. Pat. No. 4,779,207 discloses a system for preconditioning flue gas for electrostatic precipitation that includes a source of an $SO_3$ conditioning agent, means for controllably adding the conditioning agent to the flue gas, means for detecting the input power level of the electrostatic precipitators, and control means for monitoring the input power level and controlling the amount of conditioning agent added to the gas to maintain the input power to the electrostatic precipitator at predetermined levels.

U.S. Pat. No. 5,011,516 discloses a slipstream method of catalytically oxidizing $SO_2$ to $SO_3$ in the presence of fly ash wherein a portion of the flue gas is withdrawn from the main flue gas flow, passed through a converter so that $SO_2$ within the gas flow is catalytically converted to $SO_3$, and then the portion flow reinjected into the main flue gas flow upstream from the electrostatic precipitator. The catalytic converter of U.S. Pat. No. 5,011,516 comprises a series of parallel air flow passages which are lined with a catalytic material for converting $SO_2$ to $SO_3$. The parallel flow-through passages allow for passage of gasses and particulates without fouling of the catalytic material.

A controller commercially available from Castlet (Electronic Engineers) Ltd., of Lincoln, England, can control an electrostatic precipitator by detecting the presence of deleterious back ionization and intermittently applying voltage to the charging electrodes of the precipitator to minimize the back ionization phenomenon. The Castlet controller detects back ionization by interrupting the applied charging voltage at its peak value and comparing, after a preset time, the actual charging electrode voltage with a programmed charging electrode voltage to identify excess charging electrode decay rate, which is indicative of back ionization. The Castlet controller uses the difference in the actual and the programmed charging electrode voltage to determine a rate of application of voltage to the charging electrodes in an effort to optimize precipitator operation in the presence of back ionization.

U.S. Pat. No. 5,032,154 discloses, among other things, a system that provides automatic control of the opacity of the effluent of a coal-fired boiler to maintain minimal opacity of the flue gas effluent passing from the boiler into the atmosphere. Systems of U.S. Pat. No. 5,032,154 provide a controlled flow of an agent, such as sulfur trioxide, to the boiler flue gas to condition particulate matter entrained in the flue gas for removal by electrostatic means, monitor precipitator power and the opacity of the boiler flue gas after it leaves the electrostatic particle-removal means, and vary the controlled flow of conditioning agent to hunt and operate at desirable conditioning agent flow rates determined from flue gas opacity alone or combined with precipitator power.

Other conditioning systems are shown, for example, in U.S. Pat. Nos. 3,686,825; 3,893,828; 4,042,348; 4,284,417; 4,466,815; 4,533,364; and 4,624,685.

SUMMARY OF THE INVENTION

The system and method of this invention provide generation, within the ductwork for the boiler flue gas and from the flowing flue gas, of an $SO_3$ conditioning agent to enhance the electrostatic removal of particulate matter entrained in the flue gas.

In the invention, a catalytic converter for the generation of $SO_3$ conditioning agent from the flue gas is moved between an inoperative position where flue gas does not pass through the catalytic converter and an operative position where a substantial portion of the flue gas passes through the catalytic converter for the generation of $SO_3$ conditioning agent. In preferred methods and apparatus, a catalytic converter is moved between an inoperative position outside of the flue gas ductwork and an operative position within the flue gas ductwork. Furthermore, in preferred methods and apparatus, the catalytic converter may be enclosed in a housing adjacent the flue gas ductwork in the inoperative position, and the housing may be isolated from the flue gas ductwork and opened to permit maintenance and regeneration of the catalyst.

The invention provides $SO_2/SO_3$ converters particularly effective in in-duct flue gas conditioning systems of the invention. Such a $SO_2/SO_3$ converter provides a plurality of open, generally parallel paths for flue gas that are formed by a $SO_2/SO_3$ catalyst effective over a wide temperature range for the conversion of preferably low percentage of the $SO_2$ in the flue gas stream to $SO_3$ conditioning agent.

Generation of conditioning agent in systems and methods of the invention is preferably by the use of the flue gas conditioning agent demand control apparatus disclosed in U.S. patent application Ser. No. 07/882,835 filed May 14, 1992 now U.S. Pat. No. 5,288,309, and U.S. patent application Ser. No. 07/864,847 filed Apr. 7, 1992 now U.S. Pat. No. 5,288,303.

The invention is illustrated and described in more detail by the drawings and the detailed description of several preferred embodiments that follow.

BRIEF DESCRIPTION OF THE DRAWINGS

FIG. 11A is a perspective view of an $SO_2/SO_3$ converter of this invention;

FIG. 11B is a partial perspective view of a portion of the $SO_2/SO_3$ converter of FIG. 12A; and FIGS. 11C and 11D are partial plan views of the SO$_2$/SO$_3$ converter with flue gas flow paths of different cross-sections.

DETAILED DESCRIPTION OF THE PREFERRED EMBODIMENT

Figure 1:
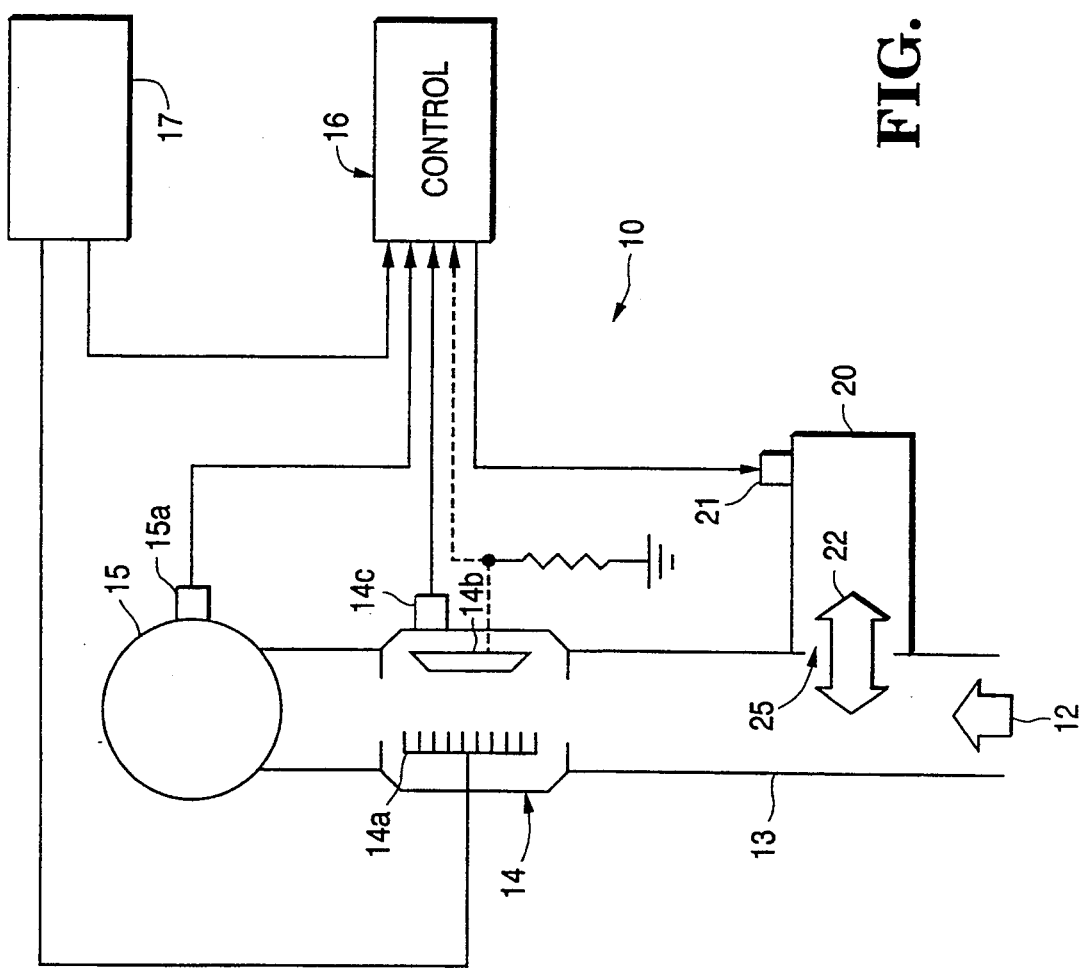
FIG. 1 is a general schematic view of a flue gas conditioning system provided by this invention.

A system 10 incorporating this invention is shown in FIG. 1. System 10 generally provides a means and method for converting sulfur dioxide (SO$_2$) contained in the particulate-laden boiler flue gas, indicated generally by arrow 12, to sulfur trioxide (SO$_3$) within a duct or conduit 13 upstream of an electrostatic means 14 to improve the removal of the particulate matter from the boiler flue gas 12 prior to its expulsion to the atmosphere from a stack 15. Precipitator 14 can include a charged electrode 14a and a collector electrode 14b. Conversion of the SO$_2$ in the boiler flue gas to SO$_3$ can be effected by an assembly 20 arranged adjacent duct 13 upstream of the precipitator 14. Assembly 20 provides an inoperable position when conditioning agent is not generated and an operable position for converting a small portion of the SO$_2$ contained in the flue gas 12 to SO$_3$, which serves to condition the flue gas 12 prior to electrostatic precipitator 14. Such a system is preferably designed to provide conditioning agent sufficient to condition the particulate matter of a boiler flue gas ranging from 3 g/m$^3$ stp to about 10 g/m$^3$ stp, and to provide a conditioning agent concentration of generally less than 40 ppm, preferably 20 to 30 ppm. As set forth below, assembly 20 is controlled by a controller 16 to provide conditioning agent for the removal of particulate matter from the stack effluent when needed.

Figure 2:
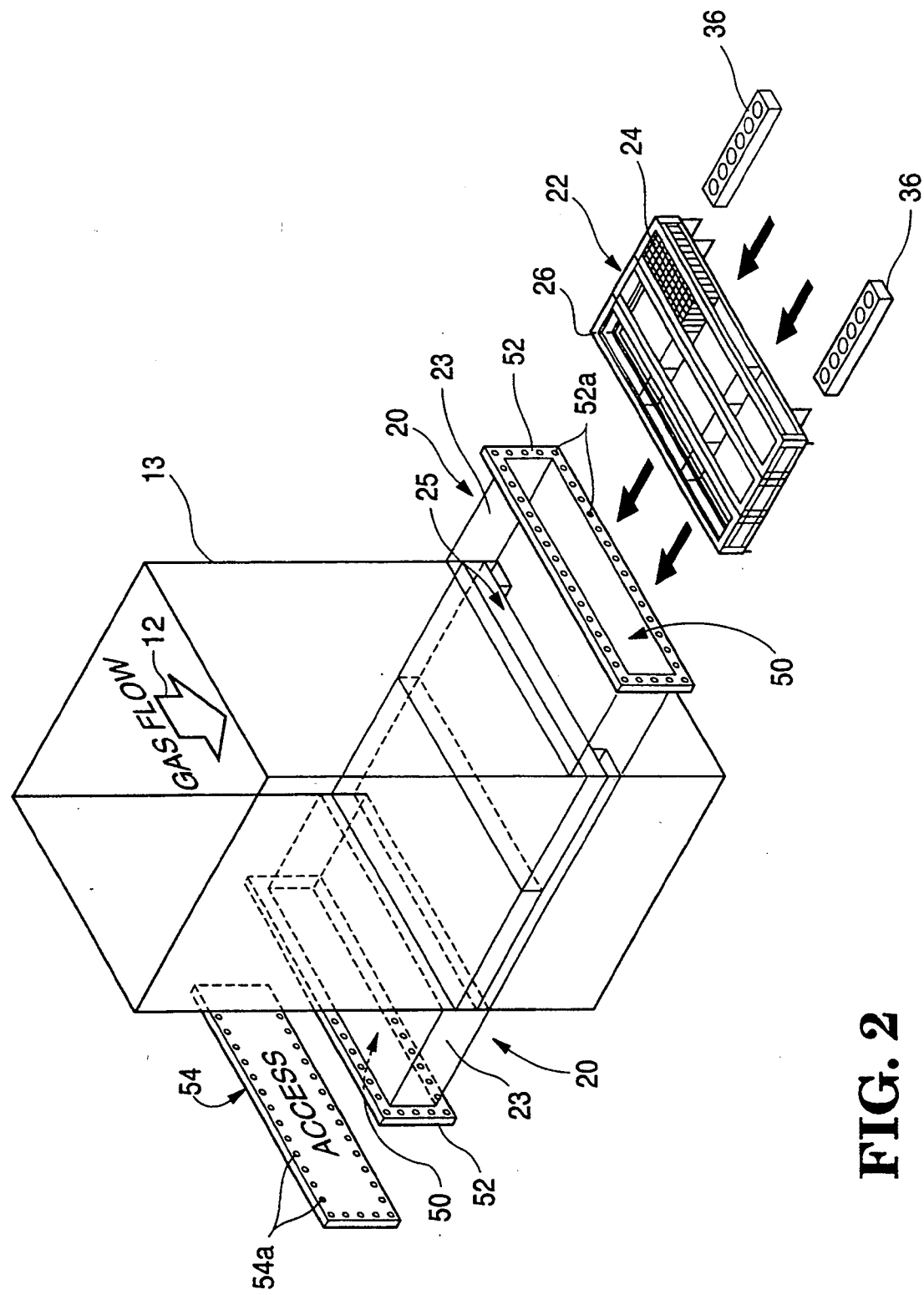
FIG. 2 is a partially exploded perspective view of an in-duct flue gas conditioning system provided by this invention shown in working arrangement adjacent a vertical flue gas duct.
Figure 3:
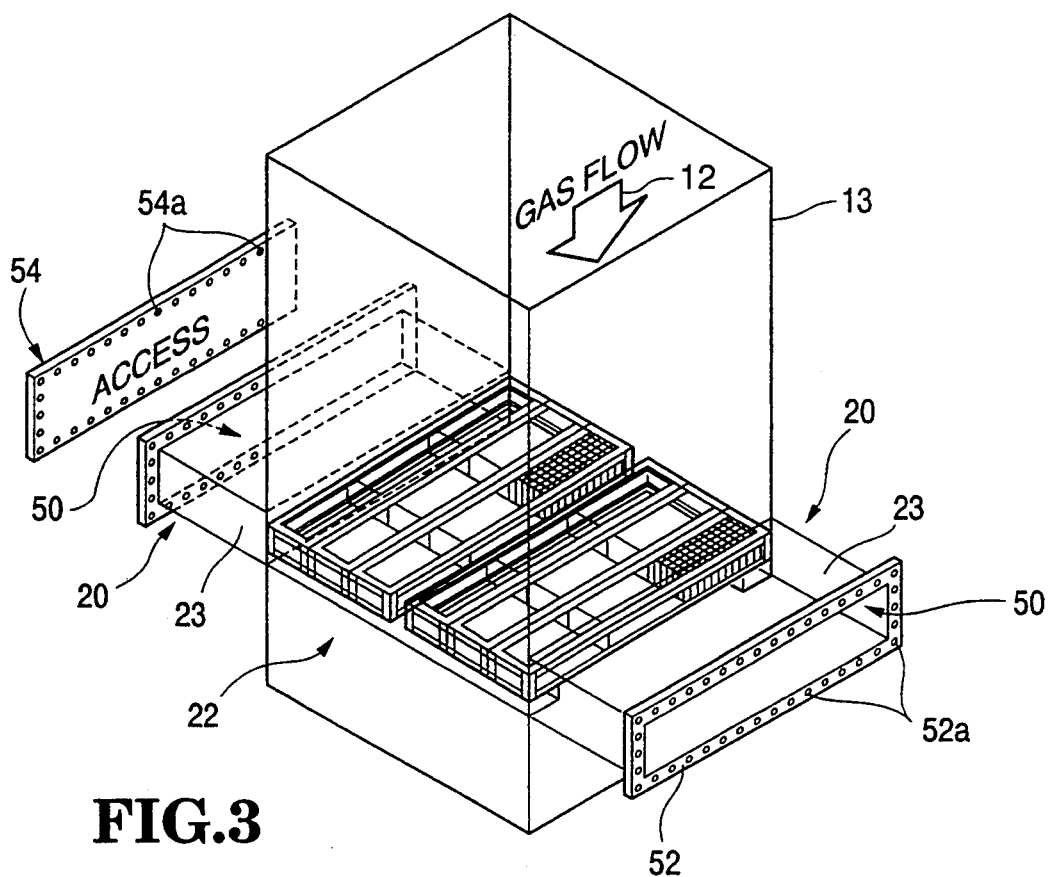
FIG. 3 is a perspective view of the in-duct flue gas conditioning system of FIG. 2 showing catalyst beds disposed in operative positions within the flue gas duct.
Figure 4:
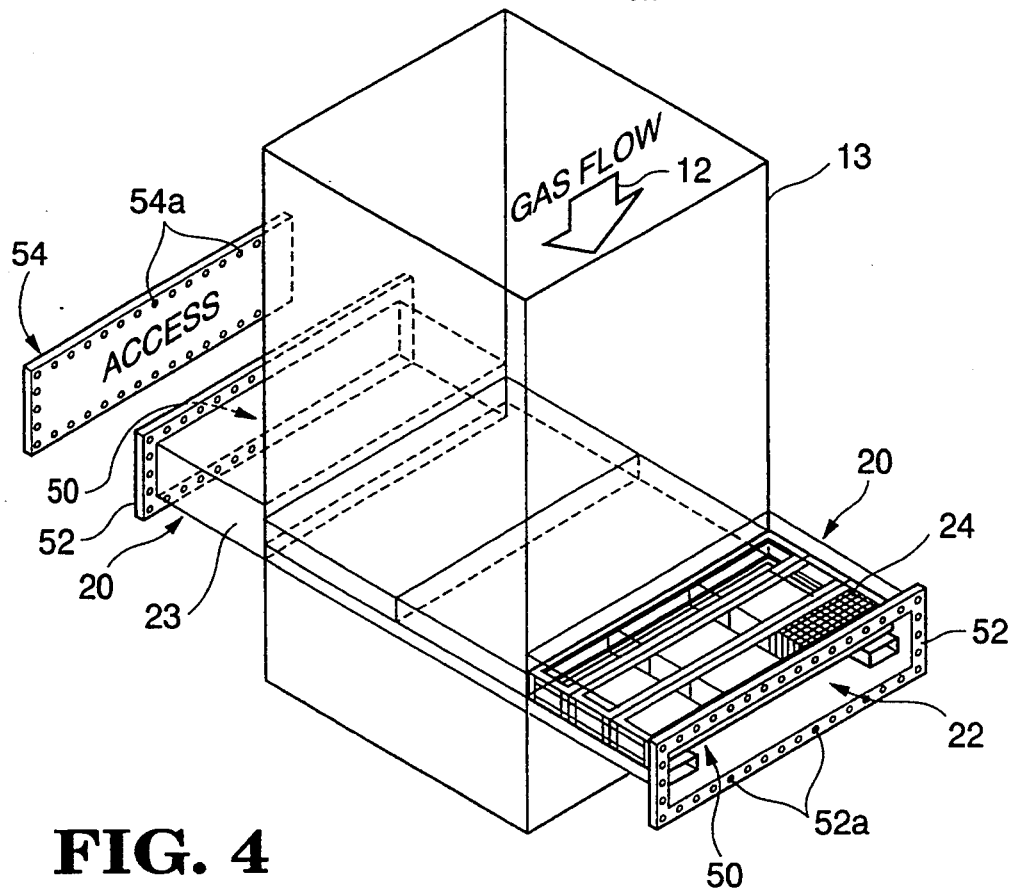
FIG. 4 is a perspective view of the in-duct flue gas conditioning system of FIG. 2 showing a single catalyst bed disposed in an inoperative position outside the flue gas duct.

Referring now to FIGS. 1–7, and particularly to FIGS. 2–4, assembly 20 can include catalytic conversion means 22, represented for simplicity in FIG. 1 by bi-directional arrow 22, movable between an operative position within the duct 13 and an inoperative position outside of duct 13. When the catalytic conversion means 22 is located in the operative position within the duct 13, it positions an SO$_2$-SO$_3$ catalyst so that a substantial portion of the flue gas 12 passes through the catalyst conversion means 22 and so a portion of the SO$_2$ contained in the flue gas 12 can be converted to SO$_3$. When the catalytic conversion means 22 is located in the inoperative position outside of the duct 13, the flue gas 12 cannot pass through the catalytic conversion means and, consequently, no conditioning agent is generated.

As shown in FIGS. 2–4, systems of the invention can comprise a pair of assemblies 20 and catalytic conversion means 22 located on opposing sides of the flue gas duct 13. While a separate assembly 20 is shown disposed on each opposing side of duct 13 in FIGS. 2–4, each assembly 20 and its elements are substantially identical, and for simplicity, reference will be made to only one of the assemblies. The discussion should be understood, however, to apply to each of the opposing assemblies 20.

Figure 5:
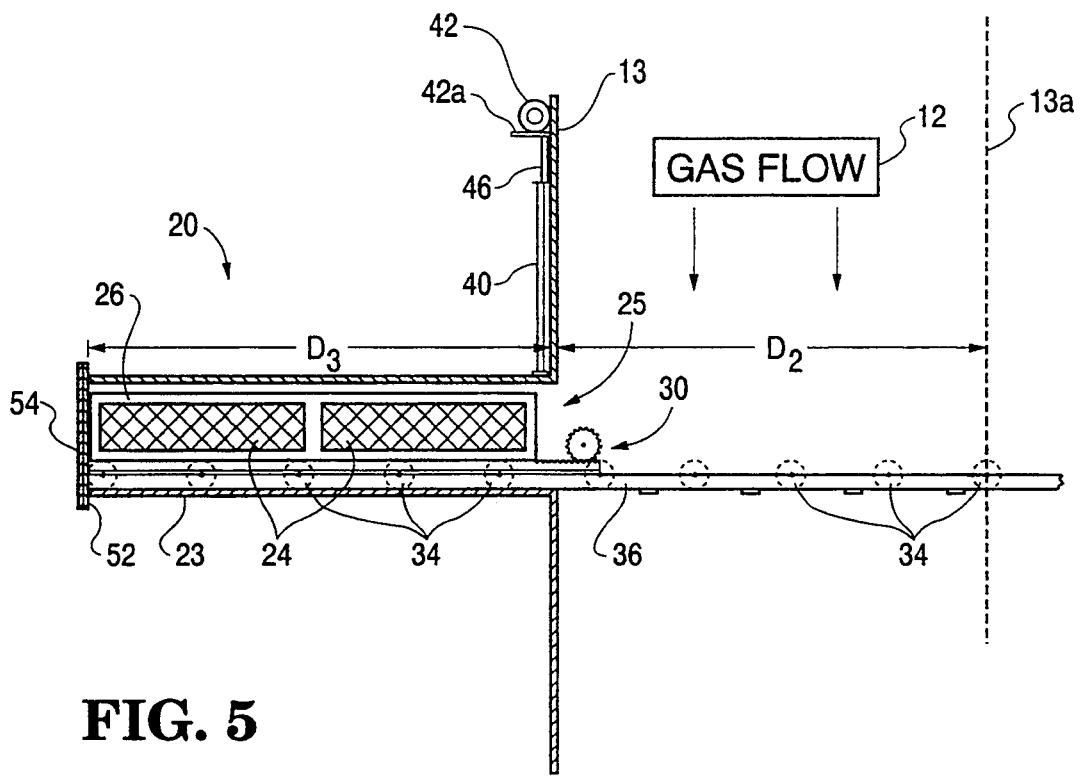
FIG. 5 is an enlarged partial cross-sectional view showing a catalyst bed of this invention as depicted in FIG. 4 in an inoperative position outside of the main flue gas duct.

Conversion means 22 can comprise SO$_2$-SO$_3$ catalytic material 24 carried and supported within a carriage means or frame 26 that is movable by any motor means, which may include, as further set forth below, hydraulic or electric motors (not shown) and a rack-and-gear assembly 30, as shown in FIGS. 5 and 7. Each assembly 20 may further comprise, as shown in FIGS. 2–6, an insulated steel housing 23 built onto the existing flue gas duct 13, generally at a right angle to the path of gas flow 12, for housing the conversion means 22 while in the inoperative position. For the use of currently available SO$_2$-SO$_3$ catalytic materials housing 23 is preferably installed on the flue gas duct where flue gas temperature is generally in the range of about 750° F. to about 1075° F. (399° C. to 579° C.) and preferably approximately 850° F. (454° C.).

Access to the interior of duct 13 from housing 23 is provided through opening 25, shown best in FIG. 2.

Figure 6:
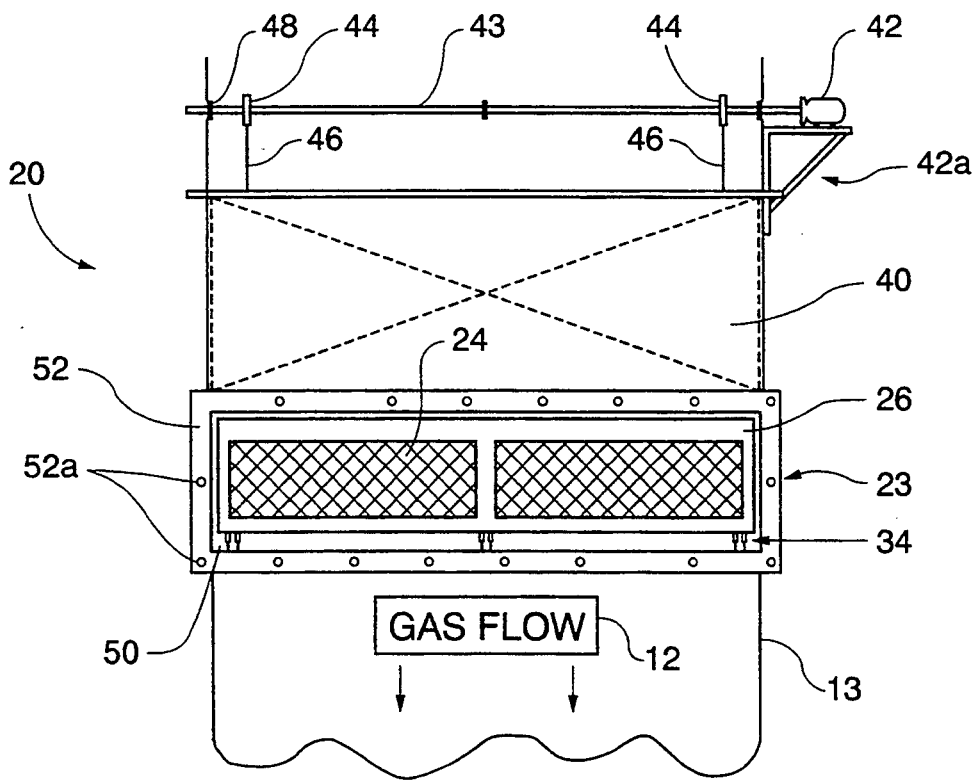
FIG. 6 is a view of the system of FIG. 5, from the left of FIG. 5, showing a damper system and access means provided by this invention.

As shown in FIGS. 5–7, each assembly 20 can further comprise a plurality of rollers 34 upon which the carriage means 26 is supported and provide a steel track means 36, which spans the flue gas duct 13, upon which the carriage means 26 travels back and forth (FIGS. 5 and 7). As shown in FIGS. 2–5, housing 23 preferably extends outwardly from the main flue gas duct 13 and the track 36 extends into the housing 23 to allow the catalytic carriage frame 26 to travel and be positioned within the housing 23 when travelling from the operative position within the flue duct 13 to the inoperative position outside the flue gas duct 13.

Each assembly 20 can further comprise a guillotine damper 40 (FIGS. 5 and 6) to close off opening 25 in the flue gas duct 13 to isolate the housing 23 and carriage frame 26 from the duct 13 for maintenance or replacement of catalyst material or for routine inspections, all while the system 10 is in full operation. If desired, soot blowers can be installed within the housing 23 to clean the carriage frame 26 periodically or if the operating pressure drop across the catalyst material 24 increases. As shown in FIGS. 5 and 6, guillotine damper 40 is positioned adjacent housing 23 and is driven by drive means 42, which may be provided by an electric motor, which, in turn, reversibly drives shaft 43 carrying pulley wheels 44 that are connected to damper 40 by cables 46. Damper drive 42 reversibly drives shaft 43 to raise and lower damper 40 as determined by controller 16. Motor 42 can be supported on a shelf-and-bracket structure 42a secured to the outside wall of main duct 13, or may be secured by any other conventional means for securing motor 42 in a fixed position to move damper 40 in a vertical path to close and open opening 25 as needed.

As shown in FIGS. 2–6, the outward side of housing 23 is provided with an opening 50, which is formed with a perimeter flange 52, to allow access into the interior of housing 23 and specifically to the carriage frame 26 for inspection or maintenance or replacement of catalyst material 24. During such times, guillotine damper 40 will be moved into position to close off opening 25 into the main duct 13. FIG. 6 is a view of the assembly 20 showing the housing 23 extending outwardly from the main duct 13 toward the reader with the access door 54 removed for clarity. Access door 54 may be detachably secured to perimeter flange 52 by a variety of conventional means, such as by threaded fasteners in threaded bore 52a.

As noted above, the apparatus of this invention can comprise a first housing 23 adjacent to and opening into one side of the main flue gas duct 13 and a second housing 23 disposed adjacent to and opening into the main flue gas duct 13 on the side opposite the first housing, with track 36 spanning across the main flue gas duct 13 and extending into each of the housings. A first movable carriage frame 26 is adapted to travel upon track means 36 and be positioned within a first housing 23 on one side of the duct 13 when travelling from a first operative position within the main flue gas duct 13 to an inoperative position outside of the main flue gas duct 13. Likewise, a second movable carriage frame 26 is adapted to travel upon track 36 and be positioned within the second housing 23 on the other side of duct 13 when travelling from a first operative position within the main flue gas duct 13 to an inoperative position outside of the main flue gas duct 13. In their respective operative positions within the duct 13, first and second carriage frames 26 are located adjacent one another and span substantially across the entire interior of the duct 13 (as shown in FIG. 3) so that substantially all of the flue gas flow 12 passes through the catalytic material 24 carried by the carriage frames 26.

Figure 7A:
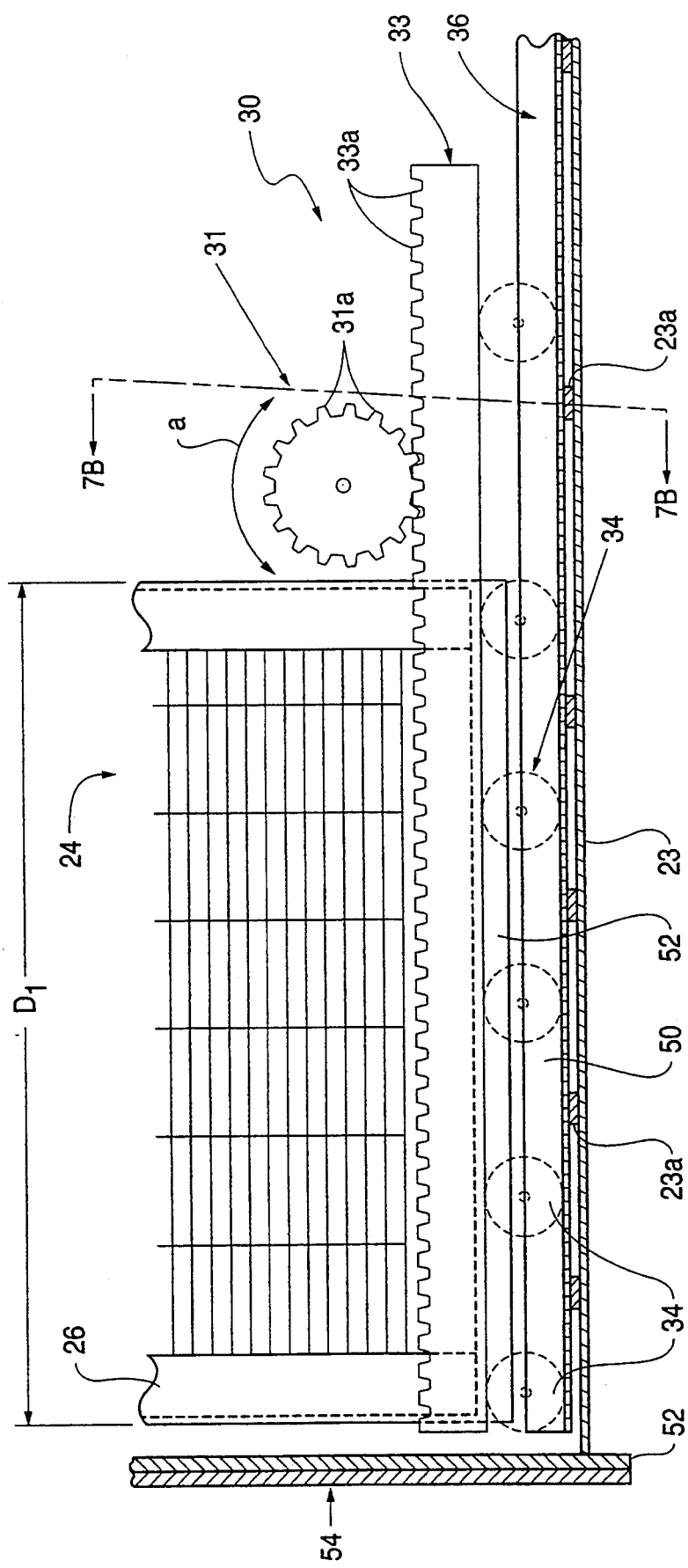
FIG. 7A is a further enlarged isolated cross section of FIG. 5 showing a catalyst bed and means provided by this invention for driving the catalyst bed between operative and inoperative positions.
Figure 7B:
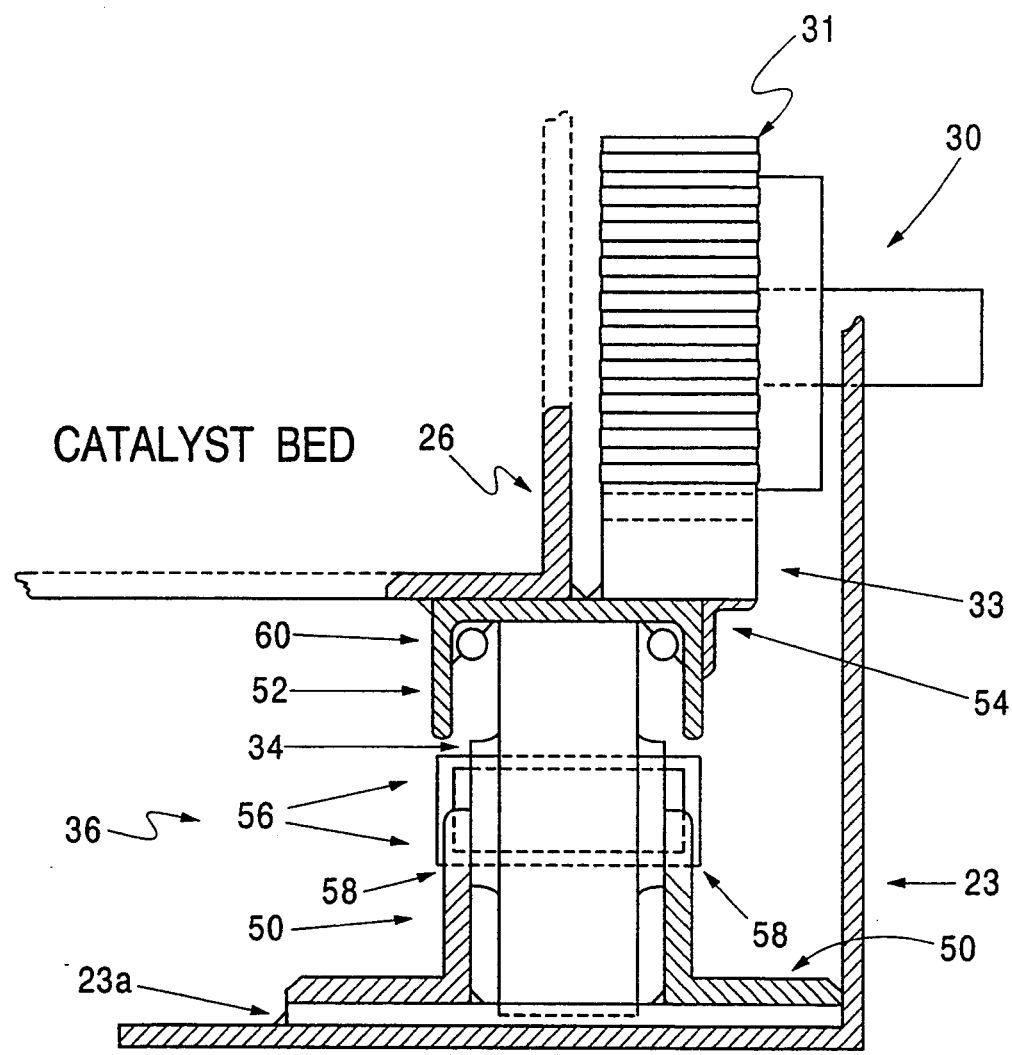
FIG. 7B is a partial cross-sectional end view of the roller assembly provided by a preferred embodiment of this invention taken from line 7B—7B of FIG. 7A.

As shown in FIGS. 5, 7A and 7B, one preferred means for moving the carriage frames 26 between their operative and inoperative positions comprises motor driven rack-and-pinion assemblies 30 including a drive gear 31, preferably a 4 inch spur gear, and a rack 33, preferably a No. 5 pitch rack. Gear 31 is preferably driven by a conventional electric motor (not shown) controlled by controller 16 to move in reverse directions, as indicated by reference arrow "a", so that a plurality of teeth 31a provided about the perimeter of gear 31 engage a flat rack 33 provided with a plurality of corresponding teeth 33a. Rack 33 is securely affixed to carriage frame 26 so that as gear 31 rotates in engagement with rack 33, carriage frame 26 is moved back and forth along track means 36 on rollers 34 which are securely affixed to track means 36 so that the carriage frame 26 and rack 33 are movably supported thereon. In one exemplary assembly 20, rollers 34 are preferably forged steel wheels having dimensions of four inches in diameter and one and one-half inches in thickness. Track means 36 can be supported within housing 23 upon spanner plates constructed of 2"×1¼" flat stock. Distance D1 of carriage frame 26 is preferably seven feet, six inches, which substantially corresponds to the interior distance D2 (FIG. 5) from the inside wall of main duct 13 to the center line 13a of duct 13, where the interior cross-distance of flue duct 13 is approximately 15 feet. In this assembly, the distance D3 from the inward surface of perimeter flange 52 and the outside wall of duct 13 is preferably eight feet.

FIG. 7B shows an enlarged partial cross-sectional end view of the rack-and-pinion assembly 30 and track means 36 and rollers 34 provided by this invention to move catalytic carriage frame 26 between its operative and inoperative positions. Such structure more particularly includes a pair of angle brackets 50 secured to the spanner plates 23a. A channel guide 52 is affixed to the underside of catalyst frame 26 adjacent its edge. As shown in FIG. 7B, channel guide 52 extends partially beyond the edge of catalyst frame 26 to provide additional support for rack 33. Angle bracket support 54 provides additional support for rack 33.

Track means 36 is formed by angle supports 50 which extend into the housings 23 and span across the main flue gas duct 13. As shown in FIGS. 7A and 7B, the plurality of rollers 34 are rotatably carried between the angle supports 50. Each roller 34 rotates about an axle 56 which is welded to angle supports 50 at reference points 58. Channel guide 52 extends fully along the length of the underside of carriage frame 26 and is guided by and rolled over rollers 34 as shown in FIGS. 7A and 7B. Alignment rods 60 are provided in the upper corners of channel guide 52 to provide better alignment and smoother movement of the catalyst frame 26 across the plurality of roller wheels 34. An arrangement like that shown in FIG. 7B is provided at the opposite edge of carriage frame 26, without however, the structure to support rack 33. If desired, however, a rack-and-pinion assembly can be provided on each side of carriage frame 26 to drive the frame back and forth. Also, if desired, a similar roller assembly can be provided along the central portion of the catalyst frame 26 to provide additional support if needed.

Figure 8:
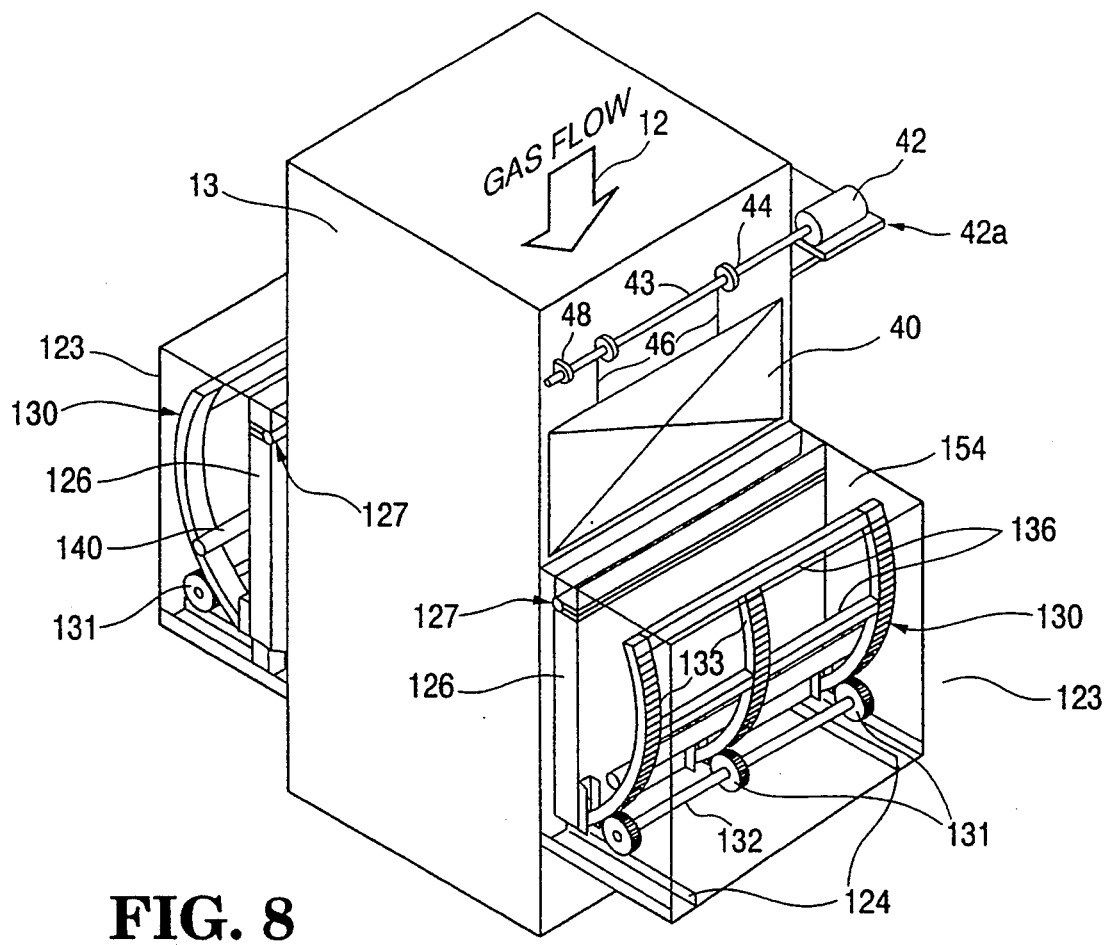
FIG. 8 is a perspective view of a further embodiment of an in-duct flue gas conditioning system provided by this invention shown in a working arrangement adjacent a vertical flue gas duct.
Figure 9:
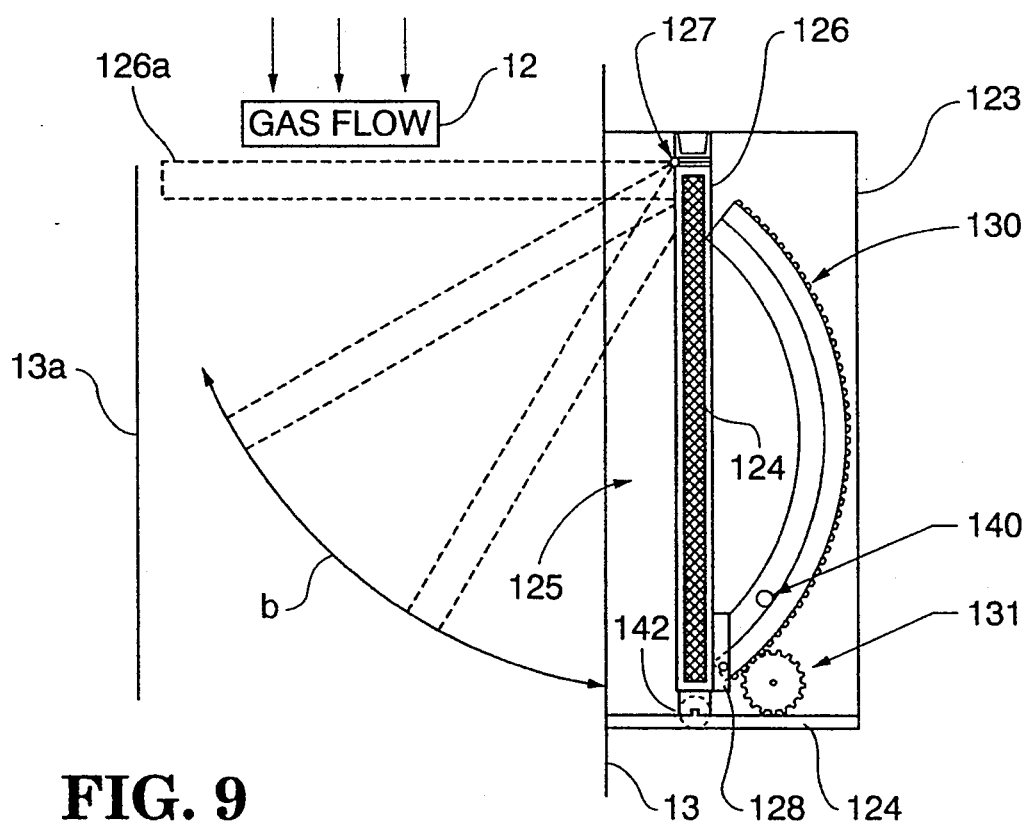
FIG. 9 is an enlarged isolated cross-sectional view showing one means by which the catalyst bed of the system of FIG. 8 can be pivotably moved between a first operative position within the gas flow and a second inoperative position outside of the gas flow.

A further embodiment of this invention is shown in FIG. 8. As shown in FIGS. 8 and 9, a movable carriage means 126 of a catalytic conversion means 22 of an assembly 20 may be pivotally supported and disposed in a housing 123 generally parallel to the flue gas duct 13 while in the inoperative position. Carriage means 126 can be moved pivotally, indicated by reference arrow "b", between an inoperative position shown in solid lines in FIG. 9 and an operative position 126a substantially normal to the flue gas flow 12 within the main flue gas duct 13, as shown in phantom lines in FIG. 9. As shown in FIG. 8, such a system can be installed on both sides of duct 13. The embodiment of FIGS. 8 and 9 includes a motor-driven curved rack-and-pinion assembly 130 comprising toothed gears 131 affixed to gear rod 132 and curved rack members 133 which engage and are driven by gears 131. Assembly 130 may include transverse support members 136 to ensure the rigidity of the assembly. An idler arm 140 is affixed in position within annex housing 123 to ride on the inward side of assembly 130 to keep the assembly 130 moving in a fixed curvilinear linear path. Gear rod 132 and gears 131 can be driven by a conventional electric motor (not shown). Gears 131 engage the rack members 133 of assembly 130, which is connected to catalyst frame 126 at one or more brackets 128 at its end opposite pivotal end 127.

In use, when actuated by control means 16, gears 131 are driven in a counter-clockwise direction, as shown in FIGS. 8 and 9, which drives assembly 130 and catalyst frame 126 in a clockwise direction, as shown in FIG. 9, to its operative position 126a, shown in phantom lines in FIG. 9, generally normal to the gas flow 12 within duct 13. In the operative position 126a, a substantial portion of the gas flow 12 passes through the catalytic material 124 carried within frame 126.

Upon being directed by control means 16 to move catalyst frame 126 to its inoperative position, the electric motor (not shown) drives gears 131 and gear rod 132 in a clockwise direction, as observed in FIGS. 8 and 9, which drives assembly 130 and catalyst frame 126 along a counter-clockwise path until catalyst frame 126 is in an inoperative position as shown in solid lines in FIG. 9. If desired, catalyst frame 126 may be provided with a roller or wheel means 142 provided at its end opposite pivotal end 127 to be received in a track 124 provided in the floor of housing 123.

The embodiment of FIGS. 8 and 9 can further include a damper 40 to close off opening 125 in the flue gas duct 13 to isolate housing 123 and catalyst frame 126 in its inoperative position from the interior of duct 13. As with the previously described embodiment, damper 40 may be driven by an electric motor 42, supported upon bracket support shelf 42a, that drives rod 43 carrying pulley wheels 44 which, in turn, reel in or let out cable 46 to move damper 40 in a vertical path to open or close opening 125. An access panel 154 can be provided in a side wall of annex housing 123 to provide access to catalyst frame 126 for inspection or maintenance or replacement of the catalyst material.

In some installations, pivoting catalyst conversion means, such as those shown in FIGS. 8-9, may be pivotally moved within the flue gas duct and driven from outside of the flue gas duct between an inoperative position parallel to and adjacent the walls of the duct where the catalyst is out of the flow of flue gas and an operative position extending across the duct where the catalyst is in the flow of flue gas. In such installations, removable panels may be installed in the duct to provide access to the catalyst and catalyst conversion means. In such installations, the rack members 133 that drive the catalyst carriage 126 may extend through sealed openings in the duct.

Conversion means 22 is activated to move between the operative and inoperative positions upon receiving a signal from a remote control means 16 (FIG. 1) based upon the need for conditioning of the flue gas 12. When a need for conditioning of the flue gas is determined by control means 16, it directs a signal to actuating means 21 of assembly 20 to move conversion means 22 to the operative position within the duct 13 so that a substantial portion of the flue gas flow 12 passes through the catalytic material 24 carried by frame 26. Conversely, when control means 16 determines that conditioning of the flue gas 12 is not needed, it directs a signal to actuating means 21 of assembly 20 to move conversion means 22 to the inoperative position where flue gas does not pass through the catalyst.

Operation of the catalyst conversion means 22 between the operative and inoperative positions is preferably effected by a conditioning agent demand control apparatus like that disclosed in U.S. patent application Ser. No. 07/882,835 now U.S. Pat. No. 5,288,309, the disclosure of which is hereby incorporated herein by reference. The combination of such control apparatus in this invention permits a determination of a satisfactory resistivity condition of the particulate matter collected within the electrostatic precipitator 14, which can permit the catalytic conversion means 22, 26, 126 to remain in its inoperative position for periods of several hours. In such systems, the control means 16 for assembly 20 can be connected with an electrostatic precipitator control adapted to sense a discharge rate of a charged electrode 14a as disclosed in U.S. patent application Ser. No. 07/882,835.

Other control means can be used, however, for operating assembly 20. For example, the control means 16 can monitor the operation of the electrostatic precipitator 14 and the opacity of the flue gas emitted from the stack 15. To this end, control means 16 can be coupled to the electrostatic precipitator control 17 and determine the power used by the electrostatic precipitator in removing particulate matter from the flue gas. Control means 16 can also be coupled to an opacity meter 15a that provides output signals proportional to the opacity of the effluent from stack 15. Control means 16 may thus determine changes in the opacity of the effluent from stack 15 that accompany such transient conditions as boiler upsets due to the incomplete combustion of coal or carbon carryover from coal combustion, ash-handling problems, precipitator rapping, boiler soot blowing and other such transient changes in operation which cannot be corrected by $SO_3$-conditioning methods and provide a conditioning agent demand signal for operation of assembly 20 as disclosed, for example, in U.S. Pat. No. 5,032,154.

A controller suitable to serve as control means 16 is Allen-Bradley's T30 Plant Floor Terminal Programmable Controller, or Bristol-Babcock's Network 3000 Compatible Intelligent Controller, but other equivalent programmable controllers can also be used. Indeed, control means 16 can be provided by a programmable microprocessor and random access memory.

Depending on the amount of conditioning agent needed, several batteries of conversion assemblies 20 can be installed in the duct 13 a certain distance apart, or the depth of the catalyst can be varied. Catalyst is available from Monsanto Enviro-Chem, St. Louis, Mo.

The catalyst material 24, which can be changed (more or less catalyst) and cleaned all with the system 10 on line, is preferably carried by carriage means 26 in replaceable perforated plate containers carried by carriage means 26, which are constructed of steel suitable for high-temperature operation. Catalyst frame 26 can be constructed of stainless expanded steel in sizes of approximately ten feet (10') in width, and seven feet six inches (7'6") in depth and one foot (1') tall. As shown in FIGS. 2–4, frame 26 can be constructed to carry therein three rows of bed baskets of catalyst material 24 with three baskets in each row. After the catalyst material is loaded into frame 26, its top is fastened to secure the baskets within the frame 26.

This invention provides an $SO_2/SO_3$ converter particularly effective for use in in-duct flue gas conditioning systems. Such an $SO_2/SO_3$ converter provides a plurality of open generally parallel paths for flue gas that are formed by an $SO_2/SO_3$ catalyst effective over a wide temperature range for the conversion of preferably low percentages of the $SO_2$ in the flue gas stream to $SO_3$ conditioning agent.

The "open" generally parallel catalyst-formed flow paths of the $SO_2/SO_3$ converters are particularly effective in the in-duct flue gas conditioning systems of the invention. The plurality of open and generally parallel flow paths provide, in aggregate, an open, or unobstructed flue gas path across the cross-section of the flue gas conduit and generally perpendicular to the direction of flow of the flue gas, and having an area in excess of about 67% of the total cross-sectional area across the flue gas flow path. The aggregate open area of the plurality of the gas flow paths preferably lies in a range of about 70% to greater than about 80% of the total cross-sectional area of the flue gas flow path. Each of the unobstructed, open and generally parallel flow paths have preferably an area that lies in the range of about 0.01 square inches (0.06 cm$^2$) to about 1.00 square inch (6.45 cm$^2$). Such unobstructed, open and generally parallel flow paths impose little or no pressure drop on the flue gas stream as it passes through the $SO_2/SO_3$ converter, yet expose a sufficient amount of the flue gas to the catalyst for the effective in-duct conversion of a significant percentage of $SO_2$ to $SO_3$.

Figure 10:
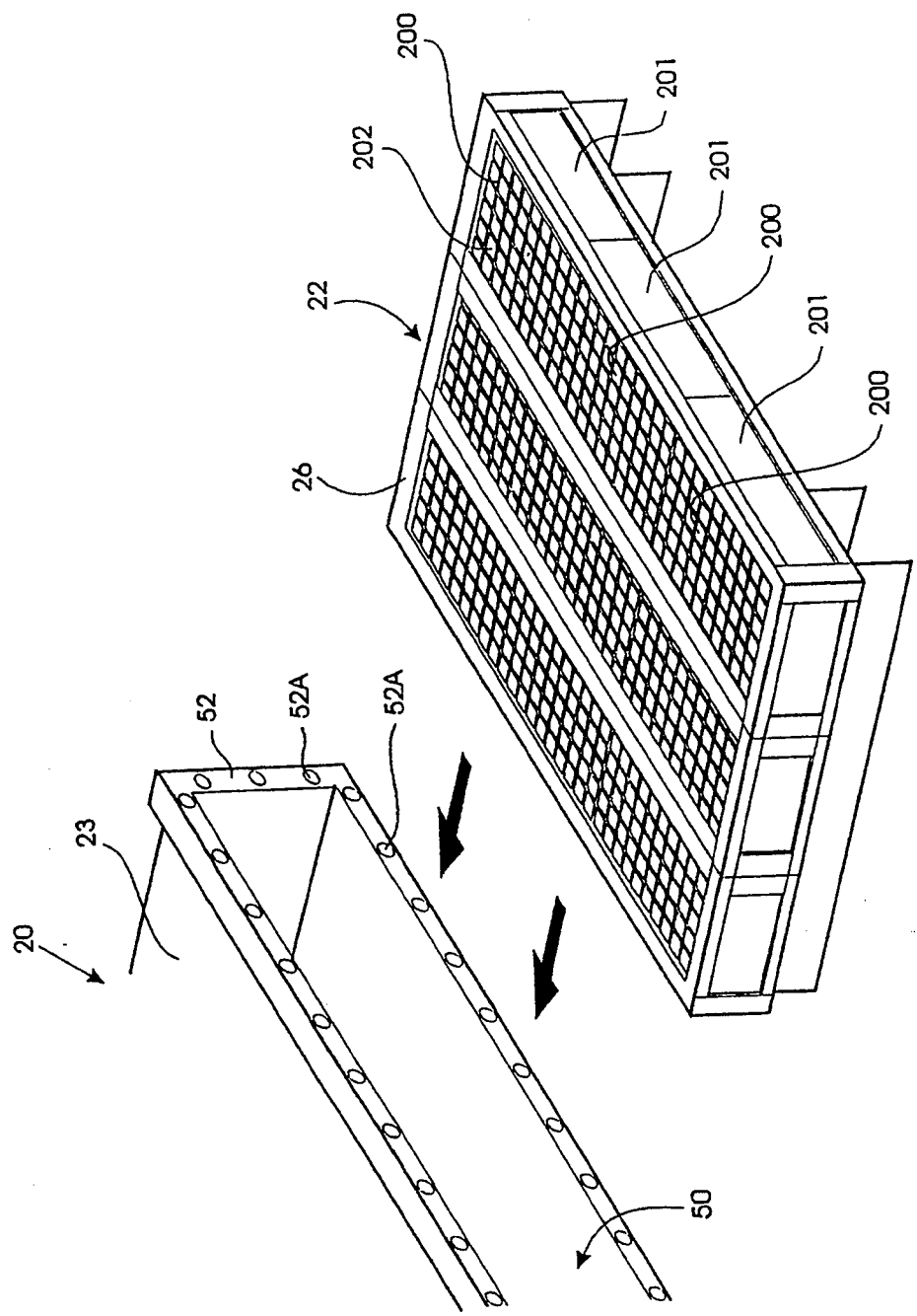
FIG. 10 is a partial perspective view of the induct flue gas conditioning system of FIG. 2 using the $SO_2/SO_3$ converters of this invention.

FIG. 10 shows an in-duct catalytic conversion means such as the in-duct catalytic conversion means of one of the in-duct flue gas conditioning systems of FIGS. 1–9. As an example, FIG. 10 shows an in-duct catalytic conversion means 22 for the flue gas conditioning system of FIGS. 1–6 described above, but with one or more $SO_2/SO_3$ converters 200 of the invention in use as the catalytic material 24.

A preferred $SO_2/SO_3$ converter 200 is shown in greater detail in FIGS. 11A–11D. The preferred $SO_2/SO_3$ converter of FIGS. 10 and 11A–11C may be formed by a foraminous ceramic substrate 201 which forms the plurality of open and generally parallel flow paths 202 for the flue gas. The ceramic from which the substrate is formed may be any ceramic material which provides the structural integrity and temperature resistance for durability in an application where the temperature cycles from ambient temperatures to temperatures on the order of 1000° F. or greater, such as Cordierite or Mullite or any of a number of other alumina and zirconia materials. It is desirable that the surfaces forming the open and generally parallel flue gas flow paths be somewhat porous.

The open and generally parallel flow paths can have any of a variety of cross-sectional shapes such as polygonal, including triangular, rectangular or square, hexagonal and circular. Such ceramic substrates for the preferred $SO_2/SO_3$ converters are available from Applied Ceramics, Inc. of Atlanta, Ga. 30359 under their trade name Versagrid.

The catalyst of the $SO_2/SO_3$ converters 200 can be a composite material, such as the CS210 catalyst available from Monsanto Enviro-Tech Corp. of St. Louis, Mo., and equivalents which will bond to the surfaces of the foraminous ceramic substrate 201 and provide conversion of the $SO_2$ in the flue gas flowing through the $SO_2/SO_3$ conversion device to $SO_3$ in low percentages, such as from about 2% to in excess of about 10% and preferably at such low percentages as from about 3% to about 5%. Such low percentage direct conversion of the $SO_2$ of the flue gas flowing in the flue gas conduit leading from the boiler provides a desirable $SO_3$ concentration for conditioning the flue gas for subsequent electrostatic removal. The catalyst will form a thin coating on the surfaces of the ceramic substrate 201. Because the catalyst coating is thin, it is not shown in FIGS. 11A–11D, but it is to be understood that the internal surfaces forming the passageways 202 are coated with such catalyst.

FIG. 11A shows an example of one of a plurality of $SO_2/SO_3$ converters 200 that can be placed in the catalytic conversion means 22. Such an $SO_2/SO_3$ converter 200 of FIG. 11A can, for example, have a width of 9 inches (22.9 cm), a length of 12 inches (30.5 cm) and a thickness of 3 inches (7.6 cm) and the open and generally parallel flow paths 202 formed thereby can have a square cross-section with sides 201a of ¾ inch (1.9 cm). As noted above, the cross-section of the open and generally parallel flow paths 202 can have other shapes and cross-sectional areas than that shown and described in FIG. 11A, as shown in FIGS. 11C and 11D, for example, ⅜ inch by ⅜ inch, and each $SO_2/SO_3$ converter can be made in any other convenient shape, for example, circular, and with any larger or smaller dimensions.

As shown in FIG. 11, a plurality of such $SO_2/SO_3$ converters can be easily carried by the catalytic conversion means 22 between its operative and inoperative positions. As indicated above, the catalytic conversion means 22 can be moved to an operative position inside the flue gas conduit 13 (FIG. 3) and position the plurality of $SO_2/SO_3$ converters 200 across the flow of flue gas in conduit 13 with their open and generally parallel flue gas flow paths 202 generally parallel to the flow of flue gas in conduit 13, thus imposing little pressure drop on the flue gas as it flows through the catalytic converter means 22 but converting a small but effective percentage (e.g., about 3% to about 5%) of the $SO_2$ within conduit 13 into $SO_3$ flue gas conditioning agent that is mixed with and conditions the particulate matter being carried by the flue gas for electrostatic removal. Such $SO_2/SO_3$ converters work effectively in particulate-laden flue gas and operate at high gas velocity with low pressure drop. The catalyst applied to the foraminous ceramic substrate 201 can be composed of vanadium pentoxide and potassium and cesium-based material to provide controlled conversion of $SO_2$ to $SO_3$ over a wide operating temperature range that allows the $SO_2/SO_3$ converters 200 to be located in variable positions within the duct 13 between the economizer outlet and the airheater inlet. In addition, the $SO_2/SO_3$ converters 200 are easily removed from the catalytic conversion means 22, when in the inoperative position, for replacement and/or reconditioning.

While the invention has been described and illustrated in several preferred embodiments, those skilled in the art will recognize that the invention can be practiced in other embodiments, such as with flexible catalyst carriages that may be bent or slide into an operative position. Accordingly, the invention is limited only by the prior art and the following claims.

We claim:

1. In a system for conditioning flue gas generated by a boiler furnace prior to its emission to the atmosphere, including conduit means for conducting a flow of flue gas from said boiler furnace to the atmosphere and an electrostatic precipitator located in said conduit means for electrostatically removing particulate matter entrained in the flue gas, the improvement comprising:
an assembly arranged upstream of the electrostatic precipitator for converting a portion of sulfur dioxide contained in the flue gas flow to sulfur trioxide, said conversion assembly including catalytic conversion means having an operative position wherein a portion of the flue gas flow passes through said catalytic conversion means for converting a portion of the sulfur dioxide contained in the flue gas flow to sulfur trioxide, and an inoperative position wherein the flue gas flow does not pass through said catalytic conversion means, and operating means for providing said catalytic conversion means in said operative and inoperative positions,
said catalytic conversion means including one or more $SO_2/SO_3$ converters comprising a foraminous ceramic substrate forming a plurality of open and generally parallel flow paths for flue gas provided with a $SO_2/SO_3$ catalyst material.

2. The system of claim 1 further comprising means for informing said operating means when conditioning of the flue gas is needed, and wherein said catalytic conversion means is movable and is activated by said operating means to move between said operative and inoperative positions based upon the need for or lack of need for conditioning of the flue gas flow.

3. The system of claim 1 wherein said plurality of open and generally parallel flow paths for flue gas have an unobstructed cross-sectional area lying in the range of from about 0.01 square inches to about 1.00 square inch.

4. The system of claim 1 wherein said foraminous ceramic substrate forms a plurality of flue gas flow paths with polygonal cross-sections.

5. The system of claim 4 wherein said polygonal cross-sections are rectangular.

6. The system of claim 4 wherein said polygonal cross-sections are triangular.

7. The system of claim 1 wherein said foraminous ceramic substrate forms a plurality of flue gas flow paths with circular cross-sections.

8. The system of claim 1 wherein said open and generally parallel flow paths provide at least 67% of the total cross-sectional area of the $SO_2/SO_3$ converter lying perpendicular to flue gas flow path.

9. The system of claim 1 wherein the plurality of open and generally parallel flow paths formed by said foraminous ceramic substrate have a length greater than about an inch.

10. The system of claim 1 wherein the open and generally parallel flow paths are about 12 1inches in length.

11. In an apparatus for converting sulfur dioxide contained in boiler flue gas into sulfur trioxide that includes a main flue gas duct leading to an electrostatic means for removing particulate matter from the flue gas, the improvement comprising:

a catalytic converter for converting $SO_2$ to $SO_3$, said catalytic converter being disposed adjacent to the main flue gas duct, said catalytic converter providing a plurality of open and generally parallel flue gas flow paths formed with $SO_2/SO_3$ catalyst and being movable between an operative position within the main flue gas duct whereby a portion of the flue gas passes through the plurality of open and generally parallel flue gas flow paths of the catalytic converter and an inoperative position outside of the main flue gas duct whereby no flue gas passes through said catalytic converter, and means for moving said catalytic converter between said operative and inoperative positions.

12. The apparatus of claim 11 wherein said $SO_2/SO_3$ catalytic converter comprises a foraminous ceramic substrate, said foraminous ceramic substrate forming a plurality of open and generally parallel flow paths for flue gas, said foraminous ceramic substrate having bonded to the surfaces forming the flue gas flow paths a $SO_2/SO_3$ catalyst composition for providing conversion of $SO_2/SO_3$ at a temperature greater than about 750° F.

13. The apparatus of claim 11 wherein said plurality of open and generally parallel flow paths for flue gas have an unobstructed cross-sectional area lying in the range of from about 0.01 square inches to about 1.00 square inch.

14. The apparatus of claim 11 wherein said open and generally parallel flow paths represent at least 67% of the total cross-sectional area of the $SO_2/SO_3$ converter lying perpendicular to flue gas flow path.

15. The apparatus of claim 11 wherein the open and generally parallel flow paths have a length greater than about an inch.

16. The apparatus of claim 11 wherein said $SO_2/SO_3$ catalyst provides conversion of $SO_2$ to $SO_3$ in low concentrations at a temperature greater than about 750° F.

17. An $SO_2/SO_3$ converter system for flue gas conditioning, comprising:

a flue gas duct for receiving a flue gas stream a foraminous ceramic substrate, said foraminous ceramic substrate forming a plurality of open and generally parallel flow paths for flue gas, said foraminous ceramic substrate having bonded to the surfaces forming the flue gas flow paths a $SO_2/SO_3$ catalyst composition providing a controlled conversion of $SO_2/SO_3$ at a temperature greater than about 750° F.; and means for moving said substrate into and out of said flue gas stream in response to means for determining a need for $SO_2/SO_3$ conversion.

18. The $SO_2/SO_3$ converter system of claim 17 wherein said plurality of open and generally parallel flow paths for flue gas have an unobstructed cross-sectional area lying in the range of from about 0.01 square inches to about 1.00 square inch.

19. The $SO_2/SO_3$ converter system of claim 17 wherein said foraminous ceramic substrate forms a plurality of flue gas flow paths with polygonal cross-sections.

20. The $SO_2/SO_3$ converter system of claim 19 wherein said polygonal cross-sections are rectangular.

21. The $SO_2/SO_3$ converter system of claim 19 wherein said polygonal cross-sections are triangular.

22. The $SO_2/SO_3$ converter system of claim 17 wherein said foraminous ceramic substrate forms a plurality of flue gas flow paths with circular cross-sections.

23. The $SO_2/SO_3$ converter system of claim 17 wherein said open and generally parallel flow paths represent at least 67% of the total cross-sectional area of the $SO_2/SO_3$ converter lying perpendicular to flue gas flow path.

24. The $SO_2/SO_3$ converter system of claim 17 wherein the plurality of open and generally parallel flow paths formed by said foraminous ceramic substrate have a length greater than about an inch.

25. The $SO_2/SO_3$ converter system of claim 17 wherein the open and generally parallel flow paths are about 12 inches in length.

* * * * *

UNITED STATES PATENT AND TRADEMARK OFFICE
CERTIFICATE OF CORRECTION

PATENT NO. : 5,356,597

DATED : October 18, 1994

INVENTOR(S) : Robert A. Wright, et al.

It is certified that error appears in the above-indentified patent and that said Letters Patent is hereby corrected as shown below:

In Col. 15, line 6, delete "1inches" and insert therefor --inches--.

Signed and Sealed this

Twenty-sixth Day of August, 1997

Attest:

BRUCE LEHMAN

Attesting Officer

Commissioner of Patents and Trademarks